(12) United States Patent
Jastram et al.

(10) Patent No.: US 10,632,448 B2
(45) Date of Patent: Apr. 28, 2020

(54) REACTOR FOR CONDUCTING AT LEAST TWO REACTANTS

(71) Applicant: Siemens Aktiengesellschaft, München (DE)

(72) Inventors: Alexander Jastram, Magdeburg (DE); Christoph Kiener, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/527,419

(22) Filed: Jul. 31, 2019

(65) Prior Publication Data
US 2020/0038832 A1 Feb. 6, 2020

(30) Foreign Application Priority Data

Jul. 31, 2018 (EP) .................................... 18186523

(51) Int. Cl.
*B01J 19/00* (2006.01)
*B01J 19/24* (2006.01)

(52) U.S. Cl.
CPC ....... *B01J 19/2485* (2013.01); *B01J 19/0013* (2013.01); *B01J 2219/2403* (2013.01); *B01J 2219/2411* (2013.01); *B01J 2219/2419* (2013.01); *B01J 2219/2422* (2013.01); *B01J 2219/2443* (2013.01)

(58) Field of Classification Search
CPC .... B01J 19/00; B01J 19/0006; B01J 19/0013; B01J 19/24; B01J 19/248; B01J 19/2485; B01J 2219/24–2403; B01J 2219/2409; B01J 2219/2411; B01J 2219/2418; B01J 2219/2419; B01J 2219/2422; B01J 2219/2441; B01J 2219/2443
See application file for complete search history.

(56) References Cited

U.S. PATENT DOCUMENTS

| 7,261,751 B2 * | 8/2007 | Dutta ....................... B01J 8/009 252/373 |
| 2006/0045828 A1 | 3/2006 | Aaron .......................... 422/629 |

(Continued)

FOREIGN PATENT DOCUMENTS

WO      2017146099 A1      8/2017     ......... B01J 19/0013

OTHER PUBLICATIONS

Search Report for EP Patent Application No. 18186523.9, 8 pages, dated Feb. 28, 2019.

*Primary Examiner* — Natasha E Young
(74) *Attorney, Agent, or Firm* — Slayden Grubert Beard PLLC

(57) ABSTRACT

Various embodiments include a reactor comprising: a longitudinally extending reaction channel providing a flow path for a first reactant; a feed channel providing a flow path for a second reactant; multiple passage openings spaced apart from one another providing fluidic connecting between the feed channel and the reaction channel via respective partial streams for the second reactant; and a medium channel surrounding the reaction channel to bring a medium for exchange of heat with contents of the reaction channel and influencing a temperature of the reaction channel. The respective partial streams for the second reactant mix with the first reactant in the reaction channel to allow a chemical reaction of the first reactant and the second reactant.

14 Claims, 7 Drawing Sheets

(56) References Cited

U.S. PATENT DOCUMENTS

| | | |
|---|---|---|
| 2008/0108122 A1 | 5/2008 | Paul .............................. 435/183 |
| 2016/0194563 A1 | 7/2016 | Tonkovich ............... 208/111.35 |
| 2017/0197196 A1 | 7/2017 | Del-Gallo ................ B01J 19/24 |
| 2018/0326387 A1 | 11/2018 | Kamata ................... B01J 19/00 |

* cited by examiner

REACTOR FOR CONDUCTING AT LEAST TWO REACTANTS

CROSS-REFERENCE TO RELATED APPLICATIONS

This application claims priority to EP Application No. 18186523.9 filed Jul. 31, 2018, the contents of which are hereby incorporated by reference in their entirety.

TECHNICAL FIELD

The present disclosure relates to reactors. Various embodiments may include reactors for conducting at least two reactants, methods for producing a reactor of said type, and methods for producing at least one product in a reactor of said type.

BACKGROUND

Chemical reactions, such as for example highly exothermic reactions, have the characteristic that they release a large amount of heat. Such a highly exothermic chemical reaction is for example, in simple terms, a liquid-liquid reaction of at least one first component, which is denoted for example by A and in particular in liquid form, with at least one second component, which is denoted for example by B and in particular in liquid form, to form at least one reaction product, which is for example in liquid form and denoted by C. The reaction heat released per unit of time in the process is proportional to the rate of the reaction, which is dependent inter alia on the concentration and thus the degree of mixing of the components, also referred to as reagents or reactants. In other words, the components A and B are commonly also referred to as reactants, wherein the reaction product is commonly also simply referred to as product.

In order to allow the reactants to chemically react with one another, the reactants are mixed with one another. Here, if mixing of the reactants occurs too quickly, then the resulting release of heat owing to the chemical reaction may be more rapid than the dissipation of heat by heat conduction and/or convection within the reaction mixture and heat conduction through a reactor wall to a coolant, which leads to a temperature increase. In the opposite situation, in which the mixing occurs too slowly, temperature peaks owing to the local reaction cannot be dissipated by convection, which leads to local overheating of an interface between the reactants. Both phenomena lead to overheating of the reaction mixture and, in association with this, to undesired chemical byproducts and/or to thermal decomposition of the reagent and product molecules. This is also referred to as "reaction runaway". This conflict can be resolved by means of an advantageous degree of mixing with targeted dosing for example of the second component to or into the first component, wherein, with this degree of mixing, the specific heat power released is still uncritical owing to limitation of an inflow rate of a reactant but, at the same time, local overheating owing to inadequate mixing can be avoided.

In order to allow the reactants to mix and thus chemically react with one another, use is commonly made of a reactor, also referred to as reaction apparatus. If the reaction takes place under high pressure, vessel walls of a reaction apparatus should have a particular wall thickness in order to prevent rupturing of the reaction apparatus, also referred to as vessel. Thick or large wall thicknesses however lead to a high thermal resistance with regard to an exchange of heat between a coolant and the reactants and/or the product, whereby, for example in the case of a highly exothermic reaction, a desired dissipation of heat from the reactants and/or from the product to the coolant is impeded. If it is sought for the reactants and/or the product to be warmed by a medium in the form of a fluid, for example, a heat transfer from the medium via the vessel or the vessel walls to the reactants and/or the product is likewise possible only with very low effectiveness. In more general terms, use is for example made of at least one medium, in particular in the form of a fluid, by means of which it is sought to influence a temperature of the reactants and/or of the products such that an exchange of heat between the medium and the reactants and/or between the medium and the product occurs. Such an exchange of heat can be adversely affected by excessively large or thick wall thicknesses.

Furthermore, materials from which the vessel is formed should be corrosion-resistant with respect to the reagents, the product and any byproducts that form, and the medium and any other agents that come into contact with the vessel, such as cleaning and/or rinsing liquids. Depending on chemical reactivity, use is normally made of only special alloys such as high-grade steels, nickel-based, hafnium, niobium, zirconium or tantalum alloys for the materials, wherein these are often difficult to manufacture and/or to weld and thus limit the degrees of freedom with regard to the design of the vessel, in particular the geometry thereof.

The form or geometry of the reaction apparatus is normally dependent on physical-chemical parameters of the components involved. The physical-chemical parameters are for example thermal conductivity and heat capacity of the reagents and/or of the product, of the medium and of the material from which the reaction apparatus is formed. Furthermore, the physical-chemical parameters and fluid dynamics characteristics of the reagents and of the product may be decomposition temperatures of the reagents, of the product and possibly of the material from which the reaction apparatus is formed.

Furthermore, the form of the geometry of the reaction apparatus may be dependent on the reaction characteristics such as reaction enthalpies, optimum reaction pressure and temperature, temperature-dependent and concentration-dependent reaction kinetics, and existence and relevance of secondary reactions and of process parameters such as for example mass flows of reagents and medium and additional pressure loss.

Although the challenges for reactor design are extremely complex, the development of present reactor concepts is limited primarily to simple geometries and is driven predominantly by experimentation. Non-optimal reactor geometries may lead to reduced reaction throughputs, impure products, increased coolant usage and larger reactor dimensions than would be necessary in the case of a particularly advantageous or optimal design. A design targetedly directed to the above-stated parameters and the combinations thereof followed by a targeted construction is realized only in very rare cases, and then also normally using standard components.

SUMMARY

The teachings of the present disclosure describe reactors, methods for producing a reactor of said type, and methods for producing at least one product, such that, for the production of the product, at least two reactants can chemically react with one another in a particularly advantageous manner in the reactor.

For example, some embodiments include a reactor (10) for conducting at least two reactants (12, 14), having at least one longitudinally extending reaction channel (16) which can be flowed through along its longitudinal extent by a first of the reactants (12, 14), having at least one feed channel (18) which can be flowed through by the second reactant (14) and which is fluidically connected to the reaction channel (16) via multiple passage openings (22) which are spaced apart from one another and which can be flowed through by respective partial streams (20) of the second reactant (14), wherein the respective partial streams (20) of the second reactant (14) can be fed via the passage openings (22) to the reaction channel (16) and thus to the first reactant (12) in order to thus allow a chemical reaction of the reactants (12, 14) to occur in the reaction channel (16), and having at least one medium channel (26) which surrounds the reaction channel (16) and which can be flowed through by at least one medium (28) by means of which, owing to an exchange of heat with the reaction channel (16), at least a temperature of the reaction channel (16) can be influenced.

In some embodiments, the feed channel (18) can be flowed through by the second reactant (14) in a flow direction (56), and wherein the passage openings (22) are spaced apart from one another along the flow direction (56).

In some embodiments, the reactor (10) is formed as a single piece.

In some embodiments, the reactor (10) is produced by means of a generative manufacturing process.

In some embodiments, the reaction channel (16) extends in helical form.

In some embodiments, the reaction channel (16) extends in helical form around at least one length region (L) of the feed channel (18).

In some embodiments, at least the length region (L) of the feed channel (18) runs rectilinearly.

In some embodiments, respective windings (78) of the helical reaction channel (16), which thus has a winding direction (80), run in undulating fashion along the winding direction (80) and/or obliquely with respect to the winding direction (80) and/or perpendicular to the winding direction (80).

In some embodiments, the reactor (10) has, in the reaction channel (16), at least one mixing device (74) for, in particular passively, mixing the first reactant (12) with the second reactant (14).

In some embodiments, the mixing device (74) has at least one guide element (82) and/or at least one turbulence generator.

In some embodiments, the reaction channel (16) has, in at least one partial region, a cross section (76) which varies along the longitudinal extent of the reaction channel (16) and which can be flowed through at least by the first reactant (12).

In some embodiments, the reactor (10) has, in the medium channel (26), a lattice structure (68) which can be flowed around by the medium (28) and which has multiple rods (70) which are mechanically connected to one another at respective nodes (72) of the lattice structure (68).

In some embodiments, the medium channel (26) is delimited at one side by an inner circumferential lateral surface (58) of a housing (56) of the reactor (10) and at the other side by an outer circumferential lateral surface (60) of a channel element (62), wherein the reaction channel (16) is delimited by an inner circumferential lateral surface (64), which is averted from the outer circumferential lateral surface (60), of the channel element (62).

As another example, some embodiments, include a method for producing a reactor (10) for conducting at least two reactants (12, 14), having the steps: producing at least one longitudinally extending reaction channel (16) which can be flowed through along its longitudinal extent by a first of the reactants (12, 14); producing at least one feed channel (18) which can be flowed through by the second reactant (14) and which is fluidically connected to the reaction channel (16) via multiple passage openings (22) which are spaced apart from one another and which can be flowed through by respective partial streams (20) of the second reactant (14), wherein the respective partial streams (20) of the second reactant (14) can be fed via the passage openings (22) to the reaction channel (16) and thus to the first reactant (12, 14) in order to thus allow a chemical reaction of the reactants (12, 14) to occur in the reaction channel (16); and producing at least one medium channel (26) which surrounds the reaction channel (16) and which can be flowed through by at least one medium (28) by means of which, owing to an exchange of heat with the reaction channel (16), at least a temperature of the reaction channel (16) can be influenced.

As another example, some embodiments include a method for producing at least one product (28) in a reactor (10), having the steps: conducting at least one first reactant (12) through at least one longitudinally extending reaction channel (16) of the reactor (10), wherein the first reactant (12) flows through the reaction channel (16) along its longitudinal extent; conducting at least one second reactant (14) through a feed channel (18) of the reactor (10), wherein the feed channel (18) is fluidically connected to the reaction channel (16) via multiple passage openings (22) which are spaced apart from one another and which can be flowed through by respective partial streams (20) of the second reactant (14), wherein the respective partial streams (20) of the second reactant (14) are fed via the passage openings (22) to the reaction channel (16) and thus to the first reactant (12) in order to thus allow a chemical reaction of the reactants (12, 14) to occur in the reaction channel (16); and conducting at least one medium (28) through at least one medium channel (26), which surrounds the reaction channel (16), of the reactor (10), wherein, by means of the medium (28), owing to an exchange of heat with the reaction channel (16), at least a temperature of the reaction channel (16) is influenced.

BRIEF DESCRIPTION OF THE DRAWINGS

Further advantages, features, and details of the teachings herein are taught in the following description of exemplary embodiments and from the drawings. The features and feature combinations mentioned above in the description and the features and feature combinations mentioned below in the description of the figures and/or presented in the figures alone may be used not only in the respectively specified combination but also in other combinations or individually without departing from the scope of the disclosure.

In the drawing.

In the figures, identical or functionally identical elements are denoted by the same reference designations.

DETAILED DESCRIPTION

Figure 1:
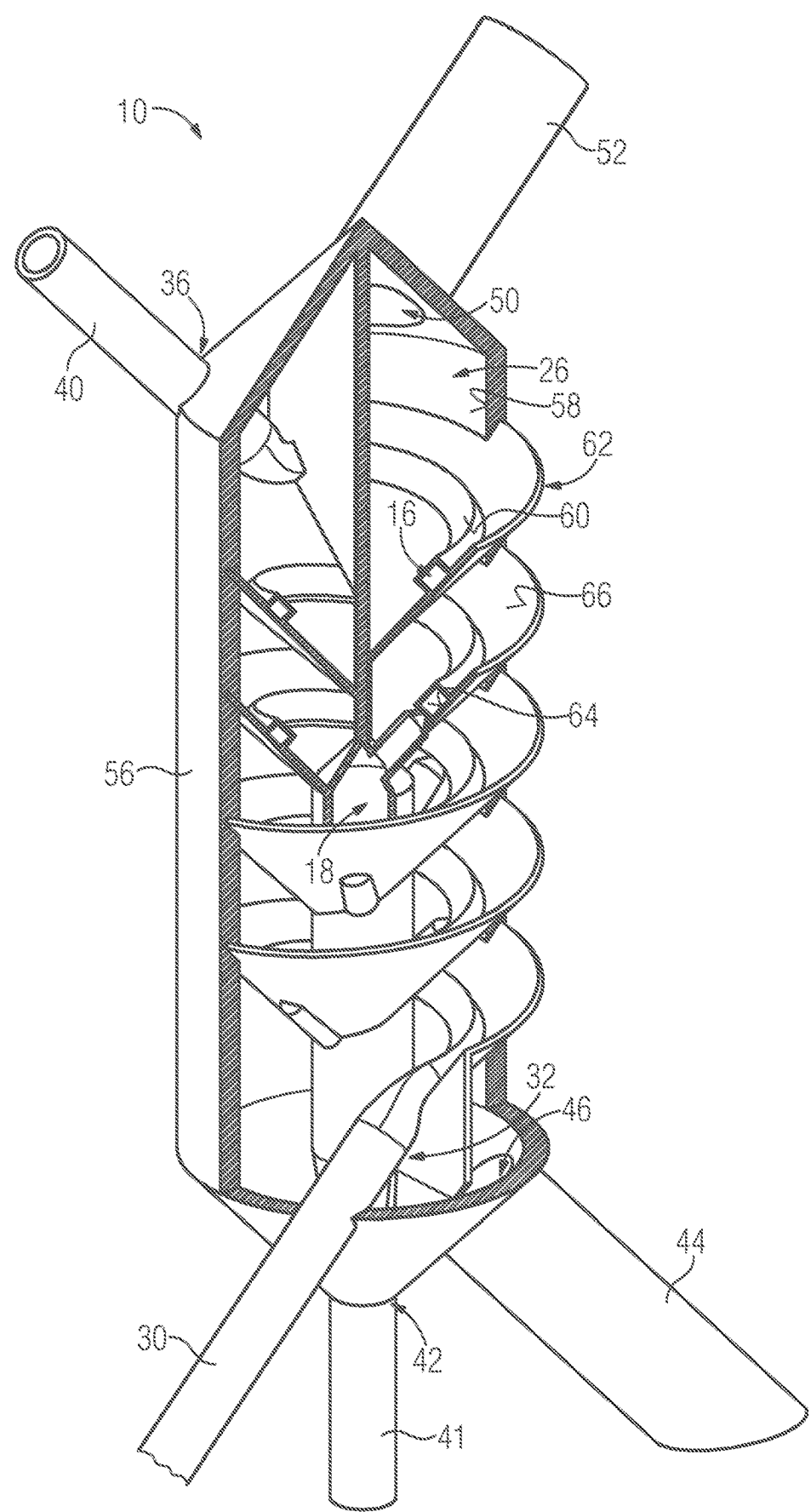
FIG. 1 shows a schematic and sectional perspective view of an example reactor incorporating teachings of the present disclosure.

Some embodiments include a reactor for conducting or guiding at least two reactants, which are also referred to as reagents. The feature whereby the reactor is used for conducting or guiding the reactants is to be understood to mean that the reactants are conducted into or introduced into the reactor and flow through at least a part of the reactor. On their path at least through the partial region of the reactor, the reactants are guided or conducted through the reactor, such that, for example, the reactants do not disperse in uncontrolled fashion in an environment or in a space in which the reactants and the reactor are situated. As will be discussed in more detail below, the reactor is used for allowing a chemical reaction, e.g. an exothermic chemical reaction, to take place or occur, and/or for causing such a reaction, between the reactants. During the chemical reaction, the reactants react to form at least one product. A first of the reactants and/or the second reactant may be liquid and thus, in the liquid state, react with the respective other reactant. It is furthermore conceivable for the product to be liquid. For example, the first and/or second reactant is introduced in a liquid state into the reactor and/or the product is conducted in a liquid state out of the reactor.

In some embodiments, the reactor has at least one longitudinally extending reaction channel, which thus has for example a longitudinal extent, wherein the reaction channel can be flowed through or is flowed through along its longitudinal extent by the first reactant. In other words, the reaction channel in which the reaction takes place is elongate in particular in the manner of a tubular reactor, such that the reaction channel is for example of tubular form. The feature whereby the reaction channel extends longitudinally and thus has a longitudinal extent is to be understood to mean that the reaction channel is longer, or has a longer or greater extent, along a flow direction along which the first reactant can flow through the reaction channel than in a respective plane running perpendicular to the flow direction or than in two further directions running perpendicular to one another and perpendicular to the flow direction.

In other words, the reaction channel is longer, in particular along its longitudinal extent or along the flow direction, than it is tall and wide. The feature whereby the reaction channel can be flowed through by the first reactant is to be understood to mean that the first reactant can be or is introduced into the reaction channel. In other words, the reaction channel can be supplied with the first reactant by virtue of the fact that the first reactant can be introduced or is introduced into the reaction channel.

Here, the first reactant may flow through at least a partial region, in particular at least a predominant part, of the reaction channel or else the entire reaction channel. In a method for producing the above-described product, the first reactant is for example introduced into the reaction channel and flows at least through a partial region of the reaction channel. Here, the first reactant need not necessarily flow through the entire reaction channel and thus be introduced at a first end of the reaction channel into the reaction channel and conducted out of the reaction channel at a second end of the reaction channel situated opposite the first end, because, for example, the first reactant, on its path through the reaction channel or at least through the partial region of the reaction channel, can chemically react with the second reactant to form the product, such that, at the second end, not or not only the first reactant but rather, with regard to the reactant and the product, for example only the product flows out of the reaction channel or is discharged from the reaction channel.

In some embodiments, the reactor has at least one feed channel which can be flowed through by the second reactant and which is fluidically connected to the reaction channel via multiple passage openings, also referred to as through-flow openings, which are spaced apart from one another and which can be flowed through by respective partial streams of the second reactant. Furthermore, the respective partial streams of the second reactant and thus the second reactant can be fed via the passage openings to the reaction channel and thus to the first reactant. In other words, the second reactant can flow in the form of the partial streams through the passage openings and thus flow out of the feed channel and into the reaction channel. In this way, the abovementioned chemical and preferably exothermic reaction of the reactants can be allowed to occur in the reaction channel and thus in the reactor, such that the reactants react to form the product, also referred to as reaction product, in the reaction channel and thus in the reactor.

The feature whereby the feed channel can be flowed through by the second reactant is to be understood to mean that the second reactant can be or is introduced into the feed channel, such that the feed channel can be supplied or is supplied with the second reactant. In particular, for example, the second reactant is introduced into the feed channel at at least or exactly one location. Respective parts, in particular in the form of the partial streams, of the second reactant can then flow for example from the location to the respective passage opening and through the passage opening and thus flow out of the feed channel and into the reaction channel.

In this way, the reactants are mixed with one another in the reaction channel, such that, or whereby, the abovementioned chemical reaction occurs between the reactants to form the product. If, for example, a first partial quantity of the first reactant and/or a second partial quantity of the second reactant does not react during the chemical reaction to form the desired product, also referred to as main product, and does not react to form a byproduct that differs from the product, then the respective partial quantity is discharged from the reaction channel at the abovementioned second end of the reaction channel. If, for example, the byproduct forms during the chemical reaction, then the byproduct is discharged from the reaction channel at the second end. By virtue of the fact that the passage openings are spaced apart from one another, the second reactant is conducted in the form of the partial streams into the reaction channel and is mixed with the first reactant, wherein the second reactant is introduced at mutually spaced-apart introduction points, at which the passage openings are arranged, into the reaction channel and thus into the first reactant and thus reacts with the first reactant. In this way, particularly advantageous mixing of the reactants with one another can be realized, such that the reactants chemically react in each case virtually completely to form the product, and such that, for example, the formation of an underside byproduct is at least virtually completely suppressed. It is thus for example the case that, at the second end of the reaction channel, with regard to the reactants and with regard to the product, only the product is discharged from the reaction channel, and there is also no byproduct which is discharged, or would have to be discharged, from the reaction channel at the second end.

In some embodiments, the reactor has at least one medium channel which surrounds the reaction channel and which can be flowed through by at least one medium. The medium is for example introduced into the medium channel and flows through preferably the entire medium channel and is thereupon conducted out of or discharged from the medium channel. By means of the medium, owing to an exchange of heat with the reaction channel, at least a temperature of the reaction channel is influenced.

In other words, by means of the medium, owing to an exchange of heat with the reaction channel, that is to say owing to an exchange of heat between the medium and the reaction channel, at least a temperature of the reaction channel can be influenced. This is to be understood to mean that the reaction channel can be warmed and/or cooled by the medium. The warming and/or cooling of the reaction channel is also referred to as temperature control of the reaction channel, such that the medium channel can also be referred to as temperature-controlled channel. In the context of the present invention, "temperature control" of the reaction channel is to be understood to mean that the reaction channel is for example simply warmed or heated or cooled.

The expression "temperature control" is not necessarily to be understood to encompass open-loop or closed-loop control of the temperature of the reaction channel. In other words, in the present case, "temperature control" is to be understood to mean that at least a temperature of the reaction channel is changed or influenced, in particular even without the temperature of the reaction channel being targetedly controlled in open-loop or closed-loop fashion. The expression "temperature control" is thus to be understood in particular as a generic term which is to be understood as encompassing "cooling and/or warming", or which can be replaced by "cooling and/or warming".

Furthermore, the feature whereby the reaction channel can be cooled and/or warmed by the medium is to be understood to mean that the first reactant accommodated in the reaction channel or flowing through at least one partial region of the reaction channel and/or the second reactant accommodated in the reaction channel and/or flowing through at least one partial region of the reaction channel and/or the product can be temperature-controlled, that is to say warmed and/or cooled by the medium. Since the partial streams flow in or can flow in through the passage opening and thus into the reaction channel, the second reactant can flow for example through at least one partial region of the reaction channel.

Below, the reactants and the product are collectively referred to as substances. In order to warm the reaction channel and possibly at least one of the substances by means of the medium, a heat transfer takes place for example from the medium to the reaction channel or to the at least one substance. Here, the medium functions as heating medium. In particular if the chemical reaction is an exothermic, in particular a highly exothermic, reaction, it may be advantageous to cool the reaction channel and, here, for example the at least one substance. For this purpose, a heat transfer takes place from the reaction channel or from the at least one substance to the medium. The medium then functions as a cooling medium. The medium is preferably a liquid. Here, the medium may at least partially include water, or be formed entirely from water.

In some embodiments, an outer wall of the reactor, also referred to as reaction apparatus, may be very thick, in order to thereby realize very high pressure resistance, that is to say a highly pressure-resistant and pressure-conducting enclosure. At the same time, by virtue of the fact that the medium channel surrounds the reaction channel, that is to say runs around the reaction channel, increased exchange of heat or heat transfer between the reaction channel and the medium can be ensured, such that excessively low or excessively high temperatures and thus temperature peaks of the reaction channel or in the reaction channel can be reliably prevented. Consequently, the product can be produced particularly advantageously in and through the reactor, in particular without undesired formation of undesired byproducts.

In some embodiments, the passage openings are spaced apart from one another, and a multiple feed of the second reactant into the reaction channel can be realized, such that the second reactant is introduced in the form of, for example, partial streams in the form of mass streams, rather than in the form of one large overall collective stream, into the reaction channel and is thus distributed in the first reactant. In this way, the chemical reaction, which for example takes place quickly, is distributed over a greater distance in relation to a conventional reaction apparatus in which the second reactant is fed in the form of exactly one collective mass stream to the first reactant, such that a reaction mixture resulting from the introduction of the second reactant into the first reaction channel and from the mixing of the reactants can be at least approximately continuously temperature-controlled, in particular cooled.

Furthermore, the multiple infeed has the effect that the first reactant is locally present in a stoichiometric excess. Here, the first reactant, which is locally present in a stoichiometric excess, and the produced product act as heat carriers in order, for example, to be able to avoid or reduce critical temperature peaks. Since the reaction channel is surrounded by the media channel, which functions for example as coolant channel, any heat released during the reaction is dissipated as directly as possible from or out of the reaction channel. At the second end of the reaction channel, the chemical reaction between the reactants is virtually complete, and therefore neither an excess of the first reactant nor an excess of the second reactant is present. Furthermore, by virtue of the fact that the reaction channel is surrounded by the medium channel, the reaction channel is embedded in a stream or in a flow of the medium which functions as cooling or heating medium or as temperature-controlled medium, wherein the medium flows through the medium channel, or is conducted in the medium channel, for example in an opposing-flow or concurrent-flow configuration with respect to the second reactant flowing through the feed channel.

In order to realize high pressure resistance in the conventional manner, conventional reaction apparatuses have small pipe diameters with a very thick wall thickness. To prevent excessive corrosion, use is commonly made of special alloys such as high-grade steels, nickel-based alloys, niobium, tantalum, zirconium, ceramics and aluminum oxide, titanium dioxide, silicon carbide and/or other expensive materials. Such special alloys are very commonly difficult to machine, in particular with regard to a precise structuring, such that use is often made only of very simple shapes. Conventional reaction apparatuses, in particular the geometrical design thereof, are commonly driven by experimentation, such that reaction apparatuses which have proven to be advantageous continue to be used or are simply scaled in the context of standardization. Individual configuration is almost never performed because a chain of processes must be undergone, which involves great outlay in terms of personnel.

Overheating is commonly counteracted by means of an axial distribution of the reaction by means of a cross-flow configuration or through the use of multiple reactors, in particular in the form of a cascade, possibly with the use of intercooling. Furthermore, use is commonly made of short thermal transport paths and thus small reactors and a parallelization and/or large specific surfaces and/or a diligent reaction with a heat carrier medium. In the latter example, aside from general procurement and disposal costs for the heat carrier, there are additional costs in terms of apparatus and energy for the substance separation if high product purity is desired.

The abovementioned problems and disadvantages can be avoided at least in part by incorporating the teachings herein. In particular, a reactor may be characterized by a parametric design or by a parameterized design. This means that the reactor, e.g. the geometry thereof, is of parametric configuration, such that the geometry of the reactor, also referred to as reactor geometry, can be adapted easily and inexpensively to the reaction, to an increased exchange of heat, in particular to an increased dissipation of heat, to a mixing behavior, and to fluid dynamics characteristics of the substances. Parametric configuration is to be understood to mean the parameters that distinguish and characterize the reactor geometry can be varied in a particularly simple and inexpensive manner, whereby the reactor geometry can be particularly easily and thus inexpensively changed and adapted to respective requirements or demands.

In some embodiments, the feed channel can be flowed through by the second reactant in a flow direction, also referred to as feed direction, wherein the passage openings are spaced apart from one another along the flow direction and, here, are preferably separated from one another. In this way, the partial streams can be introduced into the reaction channel, and thus into the first reactant, in a distributed manner. The feature whereby the passage openings are separated from one another, in particular along the feed direction, is to be understood to mean that the passage openings are for example delimited by respective walls or wall regions of a feed channel element which at least partially delimits the feed channel. Here, at least respective parts of the wall regions are arranged between the respective passage openings themselves, whereby the passage openings are separated from one another.

In some embodiments, the reactor is formed as a single piece. This means for example that the reactor is formed by a single, integral and thus single-piece component, and is thus formed on or from one piece. In other words, the reactor is not assembled from multiple components which are formed separately from one another and which are thus connected to one another, but the reactor is rather formed as a monolith or is formed by a monolith. Said monolith forms all components, parts, or regions of the reactor. In some embodiments, the reactor is thus a monolith, the structural space requirement and cost of which can be kept particularly low. Furthermore, sealing problems can be avoided, because no connecting points are provided at which components formed separately from one another are connected to one another. There are thus no connecting points that have to be sealed off in cumbersome fashion.

To be able to produce even particularly complex geometries in a simple and inexpensive manner, the reactor may be produced by a generative manufacturing process, that is to say by generative manufacturing. The reactor is thus developed and parameterized such that it can be constructed, and thus produced, without supporting structures by means of a generative process. For example, the reactor is produced by 3D printing or by means of a powder bed process and, here, is for example printed along a printing direction, also referred to as Z printing direction. Along the printing direction, the reactor is for example built up piece by piece and, here, is preferably produced as a single piece. In some embodiments, the minimum build angle in the Z printing direction with respect to an installation in which or by means of which the generative manufacturing process is performed is kept steeper than 45 degrees. Aside from the geometrical freedom, this form of manufacturing permits the embedding of at least one lattice structure in the interior of the reactor. In some embodiments, the generative manufacturing process may include powder bed fusion, in particular selective laser melting such as for example DMLM (direct metal laser melting).

In order to influence the temperature of the reaction channel and at the same time keep the structural space requirement of the reaction channel particularly small, the reaction channel may extend in helical form, in particular along its longitudinal extent. In some embodiments, the reaction channel thus has a helical form or the reaction channel forms a helical form or a helix. The helix is also referred to as screw, screw line, cylindrical spiral, or coil, and is or follows a curve which winds for example with a constant gradient around a shell of an in particular imaginary cylinder. This, for example, the reaction channel, in particular the longitudinal extent thereof, follows the above-described curve, at least globally.

In some embodiments, the reaction channel extends in helical form around at least one length region of the feed channel. In some embodiments, at least the length region of the feed channel runs rectilinearly, that is to say along or parallel to a straight line. By means of the helical form of the reaction channel, an effective length of the reactor can be kept short, wherein an infeed of the second reactant into the reaction channel, and thus into the first reactant, can be realized directly from a reactor axis. The reactor axis coincides for example with a centerline, for example with an axis of symmetry, wherein the centerline or the axis of symmetry is, in a radial direction of the helix, situated in the center thereof.

Owing to the helical form, the reaction channel is curved. This curvature gives rise to a centrifugal force in the first reactant perpendicular to the reactor axis, wherein the centrifugal force is perpendicular to a speed with which, for example, the first reactant flows through the reaction channel. The first reactant and/or the second reactant as a fluid, in particular a liquid, such that, for example, the abovementioned speed is a fluid speed.

The centrifugal force is intensified with a smaller diameter of the helix. Owing to the centrifugal force, Dean vortices are generated in the reaction channel, in particular in the cross section thereof, wherein the Dean vortices contribute to mixing of the reactants with one another.

In some embodiments, the respective windings of the helical reaction channel, which thus has a winding direction, run in undulating fashion along the winding direction and/or obliquely with respect to the winding direction and/or perpendicular to the winding direction. In this way, an increased length of the reaction channel can be realized, wherein, at the same time, the external dimensions of the reactor and/or the effective length thereof can be kept short. Furthermore, in this way, the exchange of heat between the reaction channel and the medium can be improved.

In some embodiments, the reactor has, in the reaction channel, at least one mixing device for, actively or passively, mixing the first reactant with the second reactant. This is to be understood in particular to mean that the above-stated monolith forms the mixing device. By means of the mixing device, it can be ensured that at least approximately all of the first reactant reacts with at least approximately all of the second reactant to form the product.

In order to be able to mix the reactants, the mixing device may include, for example, at least one guide element, in particular at least one guide plate, and/or at least one turbulence generator and/or at least one turbulator. The mixing device is also referred to as mixing structure, in particular as passive mixing structure.

The passive mixing structure, or the statement that the mixing device is used for passively mixing the reactants, is to be understood to mean that the mixing device does not have for example one or more mixing parts which are moved or movable relative to at least one further component of the reactor, but the mixing device is formed as a single piece with the rest of the reactor, such that the monolith also forms the mixing device. Here, the reactants are for example mixed with one another by virtue of the reactants flowing against and around the mixing device and thus being diverted or deflected and consequently mixed with one another. The mixing device thus behaves passively and is merely flowed against and flowed around by the reactants in order to thus effect mixing of the reactants with one another.

The mixing within the reaction channel influences an exchange of heat with a channel wall which at least partially, in particular at least predominantly or entirely, delimits the reaction channel, in particular an exchange of heat with the channel wall. Furthermore, the mixing influences the rate of reaction and the elimination of temperature peaks. The mixing may be realized by means of passive mechanisms, in particular by means of mixing structures in the case of which the degree of mixing and the mixing characteristic are parametrically settable. The passive mixing may be realized for example by means of a profile or a form of the reaction channel itself. Here, the reaction channel may run in serpentine-like or serpentine-shaped, sinusoidal and/or zigzag-shaped fashion. The above-described undulating profile of the reaction channel can thus also contribute to particularly advantageous mixing of the reactants.

In some embodiments, the reaction channel has, in at least one length or partial region, a cross section which changes or varies along the longitudinal extent of the reaction channel and which can be flowed through by the first reactant. In particular, the cross section may effect increased mixing of the reactants. The feature whereby the cross section varies or changes is to be understood to mean that the cross section alternates, that is to say the cross section is also referred to as alternating cross section.

In some embodiments, the passive mixing to be realized by means of internal fluid-conducting elements such as guide surfaces, turbulators and/or turbulence generators. A mixing mechanism may depend on the sheet release characteristics and the fluid dynamics, in particular the Reynolds number, of the reaction or of the process. Different mixing mechanisms may require different mesh resolutions and thus different processing times and processing powers in a CFD calculation of the reactor, and may possibly be calculated transiently, which must likewise be taken into consideration for an optimization (CFD—computational fluid dynamics). The reactor is for example designed and configured by means of the abovementioned CFD calculation, whereby the above-stated parameters can be set.

In some embodiments, the reactor has, in the medium channel, a solid lattice structure which can be flowed around by the medium and which has multiple rods which are mechanically connected to one another at respective nodes of the lattice structure. The rods and/or the nodes may be solid, such that the lattice structure as a whole may be solid. The lattice structure and thus the nodes and the rods may be inherently rigid, that is to say dimensionally stable. The feature whereby the reactor has the lattice structure is to be understood to mean that the monolith forms the lattice structure, such that the lattice structure is for example formed as a single piece with the rest of the reactor and is not for example a separate component. In some embodiments, the rods and the nodes are formed as a single piece with one another, such that the monolith forms the entire reactor or the entire lattice structure. The respective rod may have a rectilinear profile, in particular over its entire extent, that is to say all the way from one node to another node.

Since the lattice structure is arranged in the medium channel, the reaction channel is surrounded, in particular at the outside, by the lattice structure. The lattice structure in the medium channel acts as a stress-bearing structure and simultaneously as a secondary heat-conducting surface. In this way, the reaction channel or the channel wall thereof can be of particularly thin-walled design, such that a particularly advantageous exchange of heat can be ensured. Furthermore, the lattice can act as a passive mixing structure in the medium channel, such that a thermal boundary layer between the reaction channel and the medium channel or the medium itself is continually renewed.

In some embodiments, the medium channel and the reaction channel are arranged in a housing, also referred to as vessel. The feed channel may be arranged in the housing. In some embodiments, the medium channel is delimited at one side by an inner circumferential lateral surface of the housing of the reactor. On the other hand, the medium channel is delimited by an outer circumferential lateral surface of a channel element, wherein the reaction channel is delimited by an inner circumferential lateral surface, averted from the outer circumferential lateral surface, of the channel element. The feature whereby the medium channel is directly delimited by the inner circumferential lateral surface is to be understood to mean that the medium flowing through the medium channel flows directly against, and can thus make direct contact with, the inner circumferential lateral surface of the housing. The feature whereby the feed channel is directly delimited by the inner circumferential lateral surface of the channel element is to be understood to mean that the second reactant flowing through the feed channel flows directly against, and can thus make direct contact with, the inner circumferential lateral surface of the channel element. The channel element is for example formed as a single piece with the housing and/or with the abovementioned feed channel element which forms or delimits the feed channel.

In some embodiments, the channel element and thus the reaction channel and the medium channel are encased by a thick wall, wherein the thick wall forms the housing. Operational reliability of the reactor can be ensured in this way. In particular, forces from any high-pressure components can be absorbed or accommodated.

In some embodiments, at least one partial region of the lattice structure is constructed from lattice cells of identical geometry and identical size, wherein the size lies for example in a range from 1 mm to 10 mm. The size is also referred to as lattice cell size and, in various embodiments, lies in a range from 1 mm inclusive to 10 mm inclusive, in a range from 3 mm inclusive to 7 mm inclusive, or in a range from 3.5 mm inclusive to 6 mm inclusive.

The size may be an edge length of the respective lattice cell. All lattice cells may have the same geometry and the same size, or a first partial region of the lattice structure is formed from first lattice cells of identical size and identical geometry and a second partial region, which adjoins the first partial region, of the lattice structure is formed from second lattice cells of identical size and identical geometry, wherein the geometry of the first lattice cells may differ from the geometry of the second lattice cells and/or the size of the first lattice cells may differ from the size of the second lattice cells.

The respective rod is also referred to as lattice rod. In some embodiments, a diameter of the respective rod lies in a range from 0.5 mm inclusive to 3 mm inclusive, or in a range from 0.7 mm inclusive to 1.5 mm inclusive, or in a range from 0.8 mm inclusive to 1.3 mm inclusive. The respective lattice cell is also referred to as lattice type and may for example be a diamond-shaped lattice or some other lattice type which can be produced by means of a generative manufacturing process, in particular by means of a powder bed process or by means of a powder bed fusion process and/or DMLM.

In some embodiments, the feed channel is fluidically connected via the passage openings to the reaction channel and can thus be flowed through by the second reactant at the locations of the passage openings and is otherwise impermeable to the reactant, that is to say aside from the passage openings. Undesired mixing of the reactants can be prevented in this way.

In some embodiments, the reactor is formed as a monolith, and externally has only connections for media such as for example the reactants, the products and the medium and possibly for sensor inserts such as for example thermal element channels, channels for pressure measurements and/or channels for sampling, wherein the reaction apparatus is furthermore preferably a monolithic and preferably metallic component which cannot be broken down further. In other words, the reactor, in particular monolith, may be formed from a metallic material, in particular from steel. All required connections are for example implemented directly in a CAD model in order to be able to minimize reworking (CAD—computer-aided design).

The above-stated parameters that distinguish, describe or characterize the reactor, in particular the geometry thereof, may include for example:

global channel form of the reaction channel: infeed system of the first reactant, for example diameter, gradient and length of the helix; infeed of the second reactant: number of distribution points, spacing between individual infeed points or between the passage openings;

channel cross section; channel size and size ratio, which refers to the ratio of height and width of the respective channel, in particular of the reaction channel. The size ratio of the reaction channel is for example adaptable in length and width for mixing and heat dissipation;

mixing mechanism for example for liquid-liquid systems, amplitude/frequency for sinusoidal form, radius for serpentine form, angle and spacing for guide elements or guide plates;

pressure casing or housing of the reactor: in accordance with the maximum pressures to be absorbed, the wall thickness may be individually adapted with the necessary safety factor;

size of the reactor: in accordance with the substance conversion and throughflow rate, the reaction apparatus is adapted in terms of its dimensions, in particular with regard to diameter, length, and connections;

in the adaptation, the chemically compatible alloy is selected in particular with regard to corrosion, no inhibition/contamination etc., and with its physical-chemical parameters is correspondingly used for the automated configuration;

specifically for the exemplary embodiment of liquid-liquid systems: lattice shape and lattice type: the lattice structure surrounding the reaction channel can be adapted in accordance with the required pressure resistance, heat dissipation and the flow resistance in the medium.

The mixing characteristics of the reaction channel and thus also the release of heat can be optimally adapted to the boundary conditions; by means of geometrical parameter changes, it is set whether mixing is to be performed very abruptly or whether said mixing should take place over a longer distance.

The parameterized geometry may for example be linked by a CFD simulation program and optimization software in order to iteratively calculate the optimum parameters for given boundary conditions. Here, the CFD calculation returns a performance of the respective design, whilst the optimizer selects new geometrical parameters on the basis of this information. Depending on the application and priorities, different target functions and restrictions can be defined for the optimization problem.

For example, in some embodiments, the reactor size target function can be minimized, wherein the product conversion must amount to at least 98 percent (restriction 1) and the maximum fluid temperature should remain below 300° C. (restriction 2). The maximum fluid temperature is understood to mean the maximum temperature of the first reactant and/or of the second reactant and/or of the product and/or of the reaction channel. If complex reaction kinetics parameters relating to secondary reactions are present, then it is for example also possible for the selectivity of the reaction to be selected as a target function in order to minimize secondary reactions. For the CFD calculation, a CFD program is used which, for example, takes into consideration multi-physics relationships, such that the entire combination of reaction, flow and heat transfer is optimized. The result is an optimum reaction apparatus which is very well adapted to the process and reaction conditions and which is formed automatically from a parameterized basic model. Other substances, reaction kinetics, mass flows, temperatures, heat conductivities, heat capacities etc. lead to a different advantageous geometry.

Some embodiments include a method for producing a reactor for conducting at least two reactants. In a first step of the method, at least one longitudinally extending reaction channel is produced which can be flowed through along its longitudinal extent by a first of the reactants. In a second step of the method, at least one feed channel is produced which can be flowed through by the second reactant and which is fluidically connected to the reaction channel via multiple passage openings which are spaced apart from one another and which can be flowed through by respective partial streams of the second reactant.

Here, the respective partial streams of the second reactant can be fed via the passage openings to the reaction channel and thus to the first reactant in order to thus allow a chemical reaction of the reactants, in particular to form at least one product, also referred to as reaction product, to occur or take place in the reaction channel. In a third step of the method, at least one medium channel is produced which surrounds the reaction channel and which can be flowed through by at least one medium. By means of the medium, owing to an exchange of heat with the reaction channel, at least a temperature of the reaction channel, and thus for example a temperature of at least one of the above-stated substances, can be influenced. Advantages and advantageous embodiments of the apparatus are to be regarded as advantages and advantageous embodiments of the methods, and vice versa.

Some embodiments include a method for producing at least one product in a reactor. In a first step of the method, at least one first reactant is conducted through at least one longitudinally extending reaction channel of the reactor, wherein the first reactant flows through the reaction channel along its longitudinal extent. In a second step of the method, at least one second reactant is conducted through a feed channel of the reactor, wherein the feed channel is fluidically connected to the reaction channel via multiple passage openings which are spaced apart from one another and which can be flowed through by respective partial streams of the second reactant.

Here, the respective partial streams of the second reactant, and thus the second reactant, are fed via the passage openings to the reaction channel and thus to the first reactant in order to thus allow a chemical reaction of the reactants, in particular to form at least one product, also referred to as reaction product, to occur or take place, or in order to cause such a chemical reaction, in the reaction channel. In a third step of the method, at least one medium, in particular at least one fluid, is conducted through at least one medium channel, which surrounds the reaction channel, of the reactor, wherein, by means of the medium, owing to an exchange of heat with the reaction channel, that is to say between the medium and the reaction channel, at least a temperature of the reaction channel is influenced. Advantages and advantageous embodiments of the reactors and of the methods of manufacture described herein are to be regarded as advantages and advantageous embodiments of the methods for mixing, and vice versa.

Figure 2:
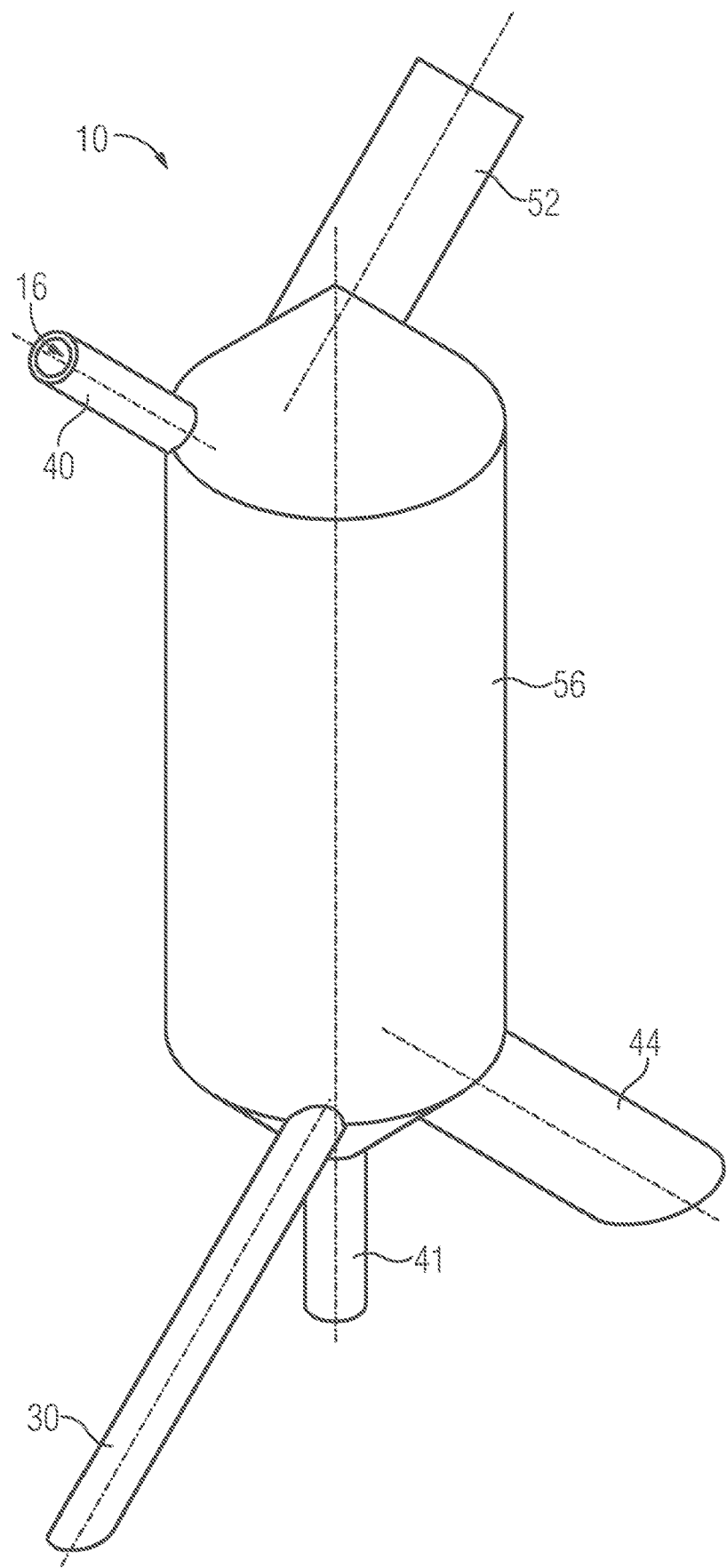
FIG. 2 shows a schematic perspective view of the reactor shown in FIG. 1.
Figure 3:
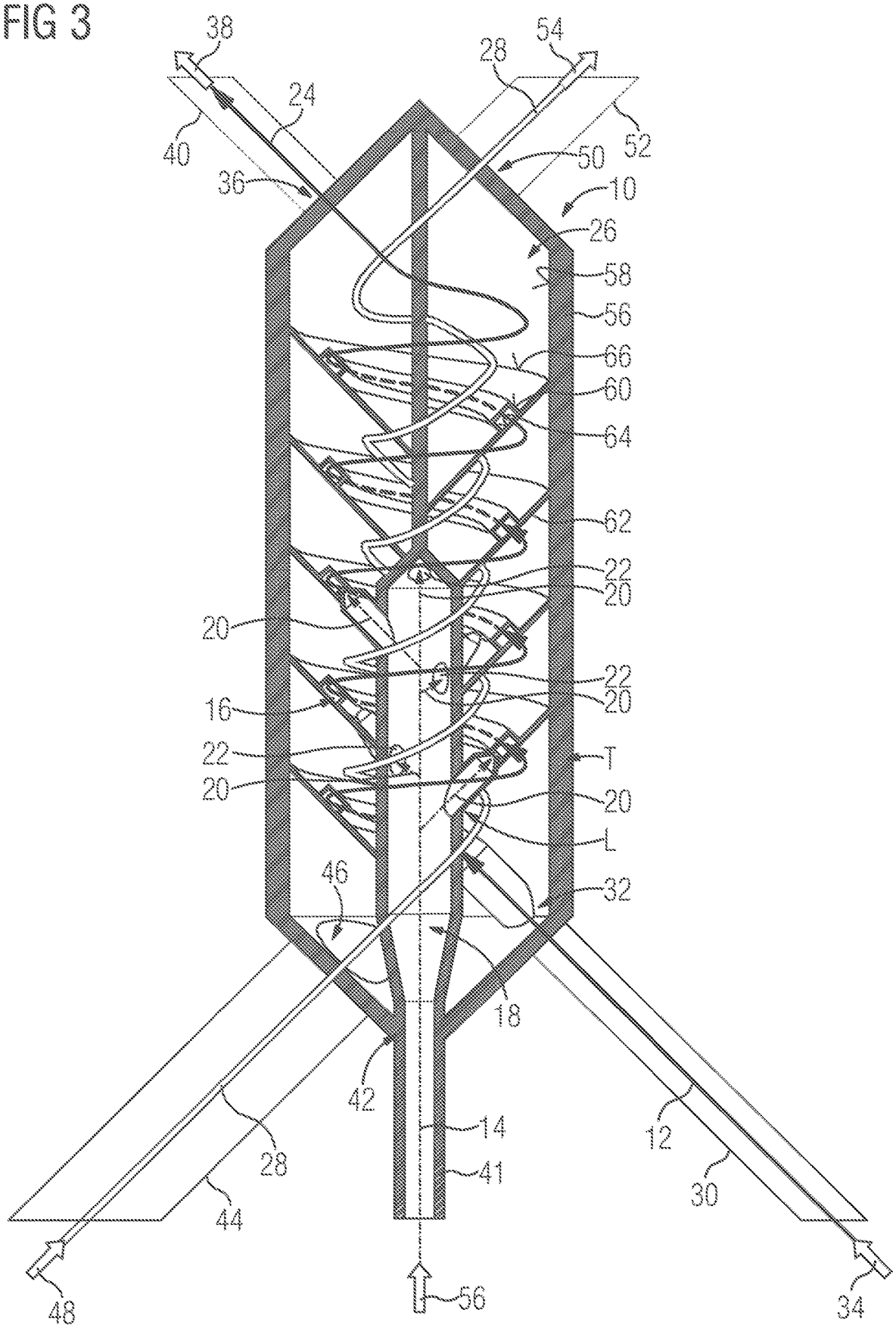
FIG. 3 shows a schematic sectional view of the reactor shown in FIG. 1.

FIG. 1 shows, in a schematic and sectional perspective view, a reactor 10 for conducting at least two reactants 12 and 14, which are schematically illustrated in FIG. 3. It can be seen particularly clearly in a juxtaposition with FIGS. 2 and 3 that the reactor 10, also referred to as reaction apparatus, has at least or exactly one reaction channel 16 which extends in elongate fashion and which, along its elongate extent, can be flowed through or is flowed through by the first reactant 12. FIGS. 1 to 3 show a first embodiment of the reactor 10, wherein the reaction channel 16 is of helical form. This means that the reaction channel 16 extends in helical fashion and thus forms a helix or has a helical form. The elongate extent of the reaction channel 16 is thus of helical form, or the elongate extent of the reaction channel 16 follows a helix or a screw line which, for example with an in particular constant gradient, winds around an imaginary cylinder shell of a circular cylinder.

The reactor 10 furthermore has at least one feed channel 18 which can be flowed through by the second reactant 14 and which is fluidically connected to the reaction channel 16 via multiple passage openings 22 which are spaced apart from one another and which can be flowed through by respective partial streams 20 of the second reactant 14. In the course of a method, the reactants 12 and 14 react chemically, that is to say in a preferably exothermic reaction, to form a product 24 also referred to as reaction product, wherein the reactants 12 and 14 and the product 24 are also referred to as components or substances. The respective partial streams 20 of the second reactants 14 are fed via the passage openings 22 to the reaction channel 16 and thus to the first reactant 14. In other words, in the course of the method, the respective partial streams 20 are introduced via the passage openings 22 into the reaction channel 16 and thus to the reactant 14, such that the partial streams 20 and thus the reactant 14 are fed into the reactant 12. In this way, the reactants 12 and 14 are mixed with one another in the reaction channel 16, such that, for example, the reactants 12 and 14 chemically react in the reaction channel 16 to form a product 24. Thus, in the method, the above-stated chemical reaction of the reactants 12 and 14 to form the product 24 occurs in the reaction channel 16.

The reactor 10 furthermore has at least one medium channel 26 which surrounds the reaction channel 16 and which can be flowed through by at least one medium which is in particular in the form of a fluid, in particular in the form of a liquid. By means of the medium 28, owing to an exchange of heat between the reaction channel 16 and the medium 28, at least a temperature of the reaction channel 16 can be influenced or is influenced. In this way, at least a temperature of at least one of the substances accommodated in the reaction channel 16 or flowing through the reaction channel 16 is set.

In the exemplary embodiments illustrated in the figures, the medium is used as a cooling medium, in particular as a cooling fluid, in order, by means of the cooling medium, to call the reaction channel 16 and thus at least one of the substances, in particular the product 24. For this purpose, a heat transfer takes place from the at least one substance or from the reaction channel 16 to the medium. In this way, the at least one substance is cooled on its path through the reaction channel 16, and the medium 28 is warmed on its path through the medium channel 26.

In FIG. 3, it can be seen that the reactant 12 is introduced into the reaction channel 16, in particular via a connection 30 of the reactor 10, at a first end 32 of the reaction channel 16. This is indicated by an arrow 34. In the reaction channel 16, at least approximately all of the reactant 12 reacts with at least approximately all of the reactant 14 to form the product 24, such that, for example with regard to the components, only or exclusively the product 24 is conducted out of or discharged from the reaction channel 16 at a second end 36 of the reaction channel 16. This is indicated by an arrow 38. The product 24 is discharged from the reaction channel 16 via a connection 40 of the reactor 10.

The reactant 14 is, via a connection 41 of the reactor 10, introduced into the feed channel 18 at a first end 42 of the latter. The reactant 14 can flow from the end 42 to the respective passage openings 22 and can flow through the passage openings 22 in the form of the partial streams 20.

Furthermore, the medium 28 is, via a connection 44 of the reactor 10, introduced into the medium channel 26 at a first end 46 of the latter, as indicated in FIG. 3 by an arrow 48. The medium 28 flows from the end 46 to an opposite, second end 50 of the medium channel 26. On its path from the end 46 to the end 50, the medium 28 is warmed owing to a transfer of heat from the reaction channel 16 to the medium 28. In some embodiments, via a connection 52 of the reactor 10, the medium 28 is discharged from the medium channel 26 at an end 50, as indicated in FIG. 3 by an arrow 54. It can be seen from FIGS. 1 and 3 that the feed channel 18, the reaction channel 16 and the medium channel 26 are accommodated in a housing 56, also referred to as vessel, and are thus encased by the housing 56. The introduction of the reactant 14 is indicated in FIG. 3 by an arrow 57. The arrow 57 also indicates a flow direction in which the feed channel 18 can be flowed through or is flowed through by the reactant 14. Here, the passage openings 22 are spaced apart from one another along the flow direction illustrated by the arrow 57.

In some embodiments, the entire reactor 10 is formed as a single piece and is thus formed by a monolith. Thus, all walls and wall regions that delimit the reaction channel 16, the feed channel 18, the medium channel 26 and the connection 30, 40, 41, 44 and 52 and the passage openings 22 are formed as a single piece with one another, that is to say are formed by the monolith. Here, the reactor 10 may be produced by means of a generative manufacturing process. Furthermore, at least a partial region T of the reaction channel 16 extends in helical form around at least one length region L of the feed channel 18, whereby an exchange of heat between the medium 28 and the reaction channel 16 can be realized. Furthermore, the length region L of the feed channel 18 extends rectilinearly, that is to say along a straight line.

It can be seen particularly clearly from FIGS. 1 and 3 that the medium channel 26 is in each case directly delimited at one side by an inner circumferential lateral surface 58 of the housing 56 and at the other side by an outer circumferential lateral surface 60 of a channel element 62, such that the medium 28 flows directly against and thus makes direct contact with the lateral surfaces 58 and 60. Here, the reaction channel 16 is directly delimited by an inner circumferential lateral surface 64 of the channel element 62, which is averted from the outer circumferential lateral surface 60 of the channel element 62, such that the reactant 12 or the product 24 can flow directly against and thus make direct contact with, or flows against and makes contact with, the lateral surface 64. Here, the reaction channel 16 is for example projected onto a helicoid which is also referred to as coil surface and which may be formed by the channel element 62 and which is denoted by 66.

Figure 4:
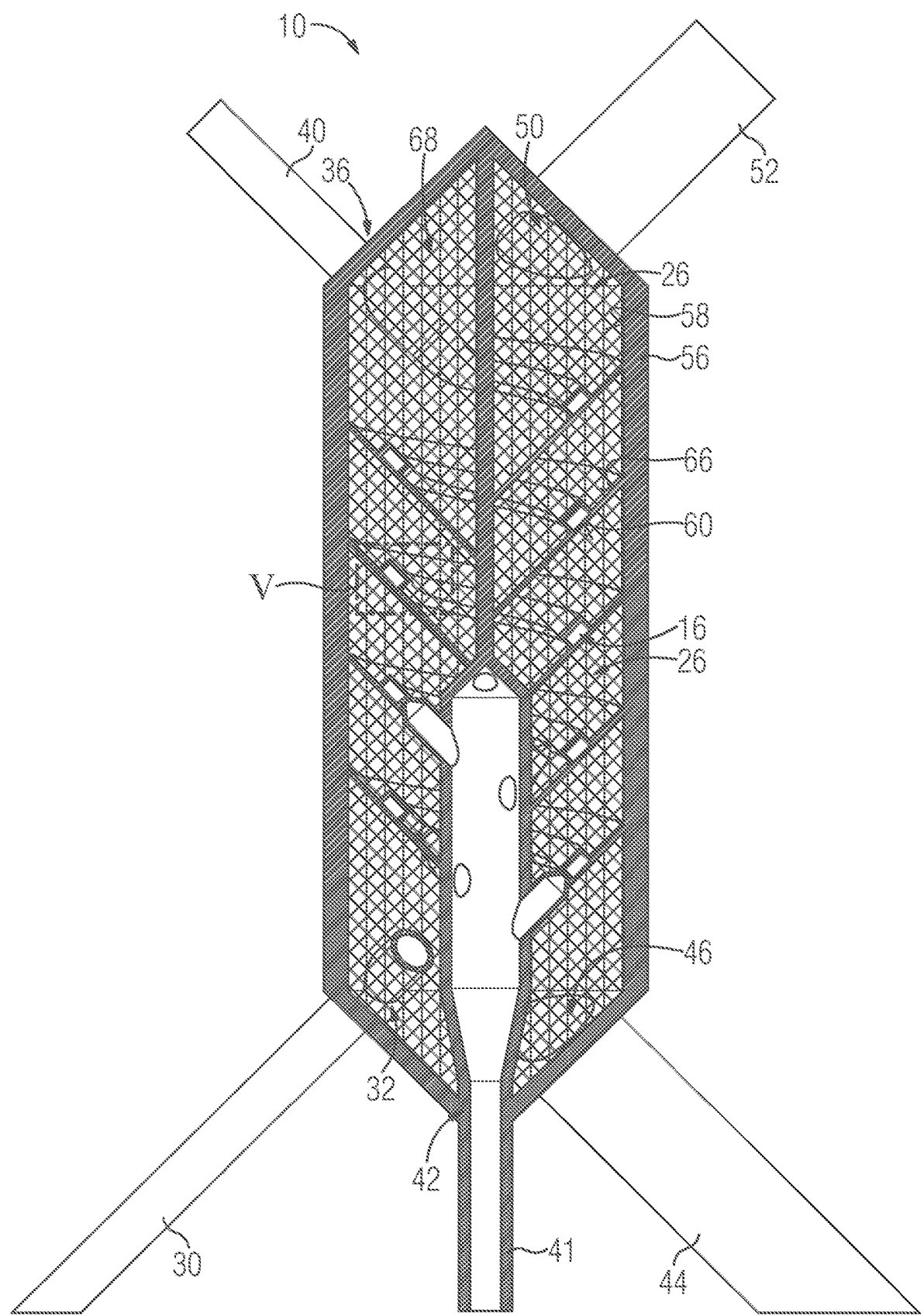
FIG. 4 shows a schematic sectional view of another example reactor incorporating teachings of the present disclosure.
Figure 5:
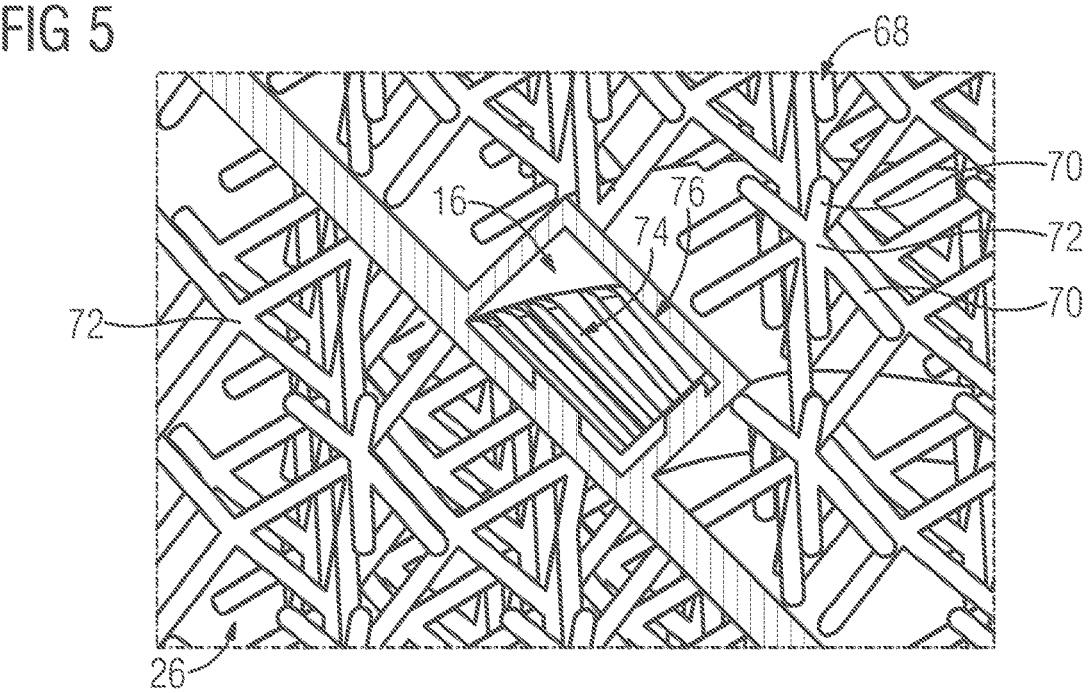
FIG. 5 shows a schematic and enlarged sectional view of a region, denoted by B in FIG. 4, of the reactor as per FIG. 4.

FIGS. 4 and 5 illustrate a second embodiment of the reactor 10. In the second embodiment, the reactor has, in the medium channel 26, a lattice structure 68 which can be directly flowed around by the medium 28 and which can be seen particularly clearly from FIG. 5. The lattice structure 68 has multiple rods 70, which are at least mechanically connected to one another at respective nodes 72 of the lattice structure 68. The lattice structure 68 or a lattice structure may also be used in the first embodiment and not illustrated in FIGS. 1 to 3.

The housing 56 delimits an interior space in which the medium channel 26, the reaction channel 16 and the feed channel 18 run or are accommodated. This interior space may be filled entirely, aside from the reaction channel 16, by the at least one lattice structure 68, wherein the lattice structure 68, for example, bears entirely against the inner circumferential lateral surface 58. Furthermore, the lattice structure 68 bears, for example, against the channel element 62 and in this case in particular against the helicoid 66 or against partitions or separating planes formed by the helicoid 66, by means of which, for example, the interior space, in particular the medium channel 26, is divided into respective partial spaces or partial regions. In this way, very high pressure resistance of the reactor 10 and a good transfer of heat or exchange of heat can be realized. As can be seen particularly clearly from FIG. 5, the respective rod 70 extends rectilinearly or has a straight profile.

Furthermore, it can be seen particularly clearly from FIG. 5 that the reactor 10 has, in the reaction channel 16, at least one mixing device 74 for passively mixing the first reactant 12 with the second reactant 14. Furthermore, in the first embodiment and/or in the second embodiment, the reaction channel 16 may have at least one partial region of a cross section 76, which varies and thus alternates along the longitudinal extent of the reaction channel 16 or along the flow direction and which can be flowed through by the first reactant 12 and which is also referred to as flow cross section. In particular, at least the partial region of the reaction channel 16 may taper along the flow direction or along the extent of the reaction channel 16 and thus be formed as a nozzle.

Figure 6:
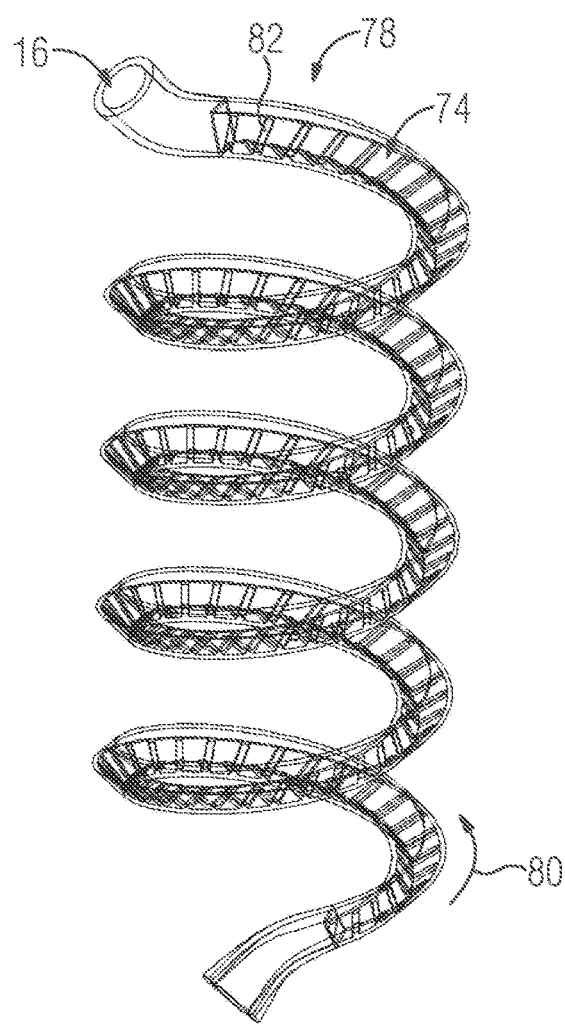
FIG. 6 shows a schematic side view of an example reaction channel of the reactor incorporating teachings of the present disclosure.

FIG. 6 shows a first embodiment of the reaction channel 16, wherein the reaction channel as per FIG. 6 can readily be used in the reactors 10 as per FIGS. 1 to 7. In the first embodiment shown in FIG. 6, the reaction channel 16 runs strictly in helical form, such that its windings 68 are not inherently, or in themselves, of undulating form.

Figure 7:
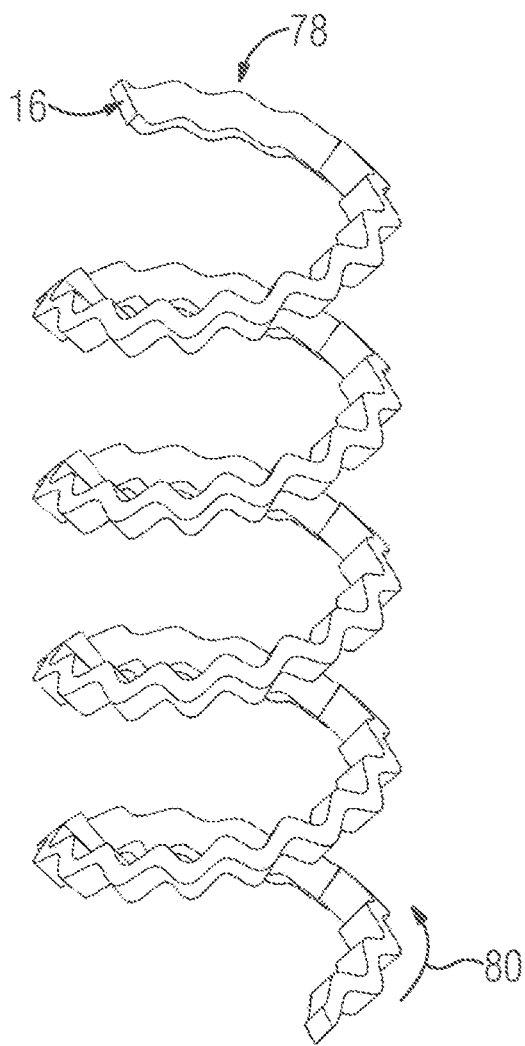
FIG. 7 shows a schematic side view of another example reaction channel incorporating teachings of the present disclosure.

By contrast, FIG. 7 shows a second embodiment of the reaction channel 16, wherein the second embodiment may readily be used in the reactors 10 as per FIGS. 1 to 5. In the second embodiment shown in FIG. 7, the windings 78 of the reaction channel 16, which is of helical form and which thus has a winding direction indicated in FIG. 7 by an arrow 80, run in undulating form along the winding direction.

Figure 8:
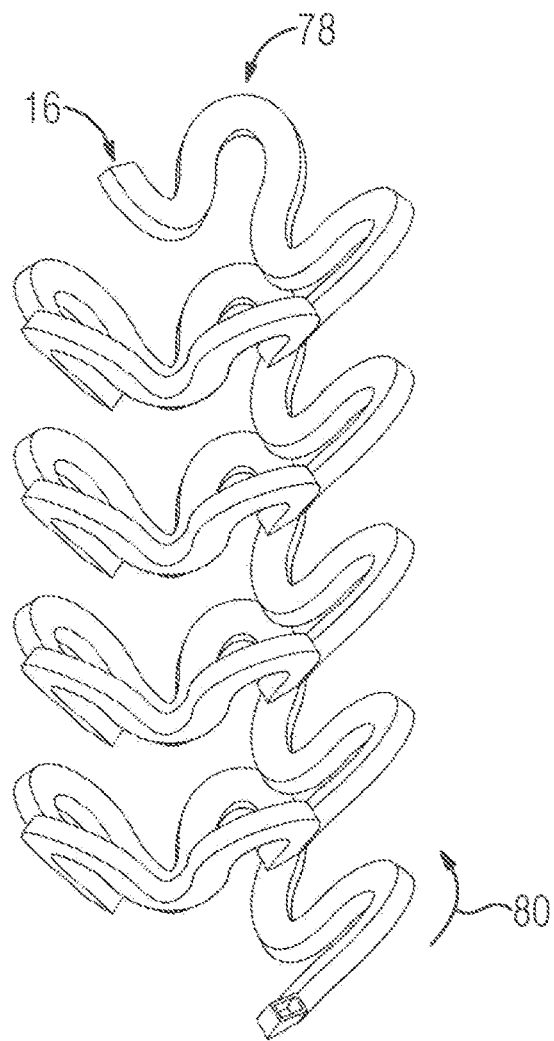
FIG. 8 shows a schematic side view of another example reaction channel incorporating teachings of the present disclosure.

Furthermore, FIG. 8 shows a third embodiment of the reaction channel 16, wherein the third embodiment may readily be used in the reactors 10 as per FIGS. 1 to 5. In the third embodiment, the windings 78 run in undulating fashion obliquely and/or perpendicularly with respect to the winding direction (arrow 80).

As already indicated above, the lattice structure 68 serves for increasing the pressure stability, such that particularly small wall thicknesses of the reactor 10 can be realized. Furthermore, an increased exchange of heat can be ensured. Positive side-effects are mixing in the medium 28 and the realization of secondary surfaces for the heat transfer to the medium 28, which in the present case functions as coolant.

Furthermore, the reactor 10 has a fully parameterized design for the adaptation of the reactor 10 two different process and reaction parameters. This leads to a reduced development time for new reactors and adaptation to different applications and to advantageous reproducibility in the configuration of the reactor 10.

Furthermore, the reactor 10 may be created by means of a generative manufacturing process and thus by additive manufacturing. In this way, even a particularly complex geometry of the reactor 10 can be realized in a simple manner, wherein the geometrical complexity is independent of the material selection. Any manufacturing limitations of the generative manufacturing process are directly taken into consideration in the parameterization. Furthermore, a monolithic design is possible in a simple manner.

In some embodiments, the reaction channel 16 is a channel in which the chemical reaction of the reactants 12 and 14 occurs. The reaction channel is elongate in the manner of a tubular reactor, with multiple infeeds of the reactant 14 in small mass flows rather than in one large mass flow. Furthermore, a size ratio of the reaction channel 16 is adaptable in particular with regard to length and width in order to be able to ensure an advantageous dissipation of heat. Furthermore, the form of the reaction channel 16 is easily adaptable, for example by means of mixing and in particular nozzle-like elements and/or through introduction of fluid-guiding guide plates, turbulence generators and/or other mixing elements. In this way, the degree of mixing and thus also the release of heat can be set, such that it is possible to set whether mixing is to be performed very abruptly or over a longer distance. Despite possibly complex flow guidance, it is possible to realize a compact design owing to the central infeed of the reactant 14 and owing to the helical form of the reaction channel 16.

As can be seen from FIG. 3, it is possible in the first embodiment and/or in the second embodiment to provide a concurrent flow of the medium 28 and of a reaction mixture that results from the mixing of the reactant 12 with the reactant 14, which reaction mixture flows through the reaction channel 16. In some embodiments, an opposing flow of the medium 28 and of the reaction mixture is readily possible. Aside from the reaction channel 16, said interior space is completely filled with the lattice structure 68, which is not shown for example in FIG. 3. The lattice structure 68 bears completely against side walls and separating planes. In this way, very high pressure resistance and good heat transfer are realized.

FIG. 6 shows the mixing device 74, which has for example multiple guide elements 82, which are spaced apart from one another along the flow direction and which are formed as guide plates, for mixing the reactants 12 and 14.

By means of the undulating design of the windings 78 shown in FIG. 7, these can be formed as sine loops or of sinusoidal form. In the third embodiment shown in FIG. 8, the windings 78 are for example formed as serpentines or of serpentine-like form. The different embodiments shown in FIGS. 6 to 8 have different reactant infeeds and different mixing and cooling characteristics.

Figure 9:
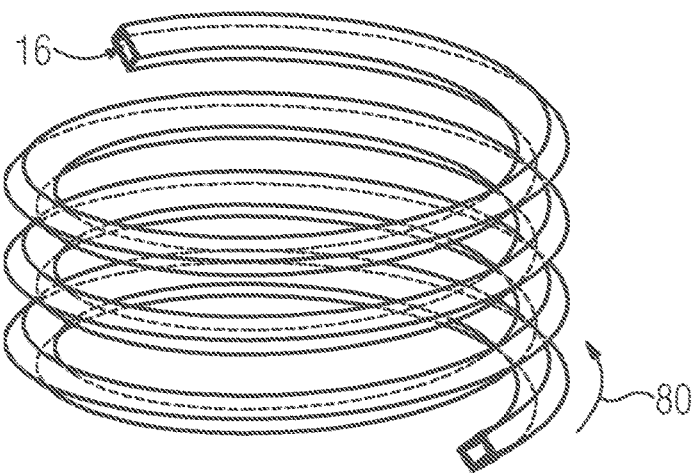
FIG. 9 shows a schematic side view of another reaction channel incorporating teachings of the present disclosure.
Figure 10:
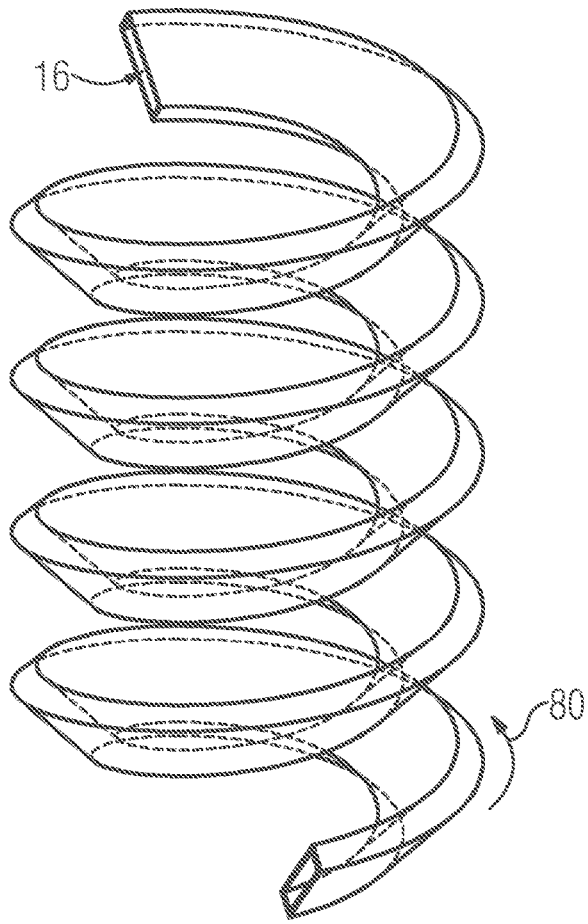
FIG. 10 shows a schematic side view of another reaction channel incorporating teachings of the present disclosure.
Figure 11:
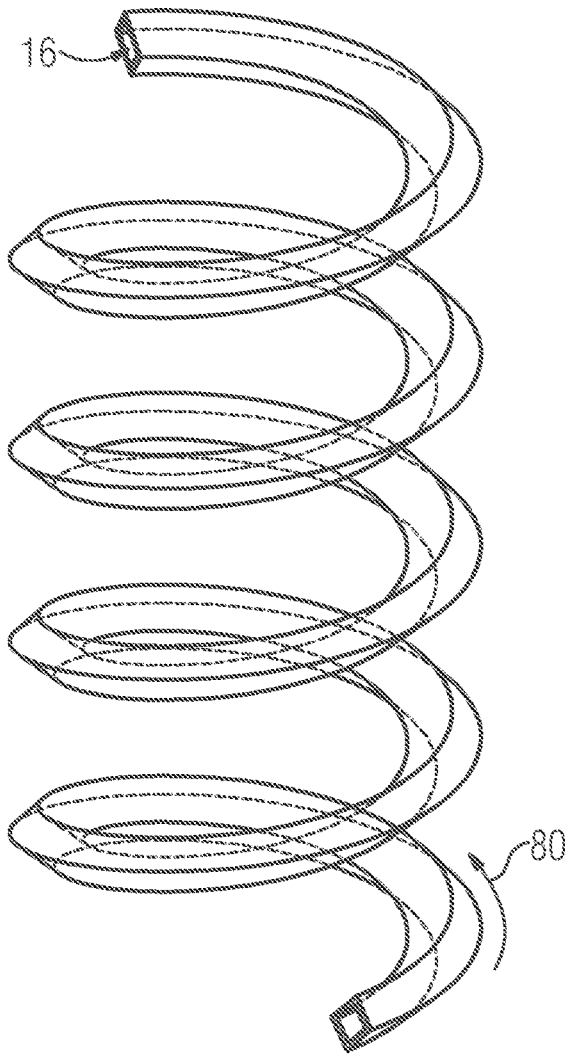
FIG. 11 shows another example reaction channel incorporating teachings of the present disclosure.

By means of the parameterized design, it is possible in a simple manner for different geometries of the reactor 10, in particular of the reaction channel 16, to be realized, which can be seen in FIGS. 9 to 11 from the example of the reaction channel 16. In other words, by simply changing parameters that define the reactor 10 or the geometry thereof, the geometry of the reactor 10 can be varied in a simple manner. In this way, it is for example possible for the reaction channel 16 to be easily varied, in particular with regard to its length and/or form and/or with regard to a cross section, which can be flowed through by the respective substance, of the reaction channel 16 and/or with regard to the number of turbulence generators or mixing elements in the reaction channel 16. The reaction channel 16 shown in FIGS. 6 to 11 can be readily used for the reactors 10 as per FIGS. 1 to 5 and vice versa.

LIST OF REFERENCE DESIGNATIONS

10 Reactor
12 First reactant
14 Second reactant
16 Reaction channel
18 Feed channel
20 Partial stream
22 Passage opening
24 Product
26 Medium channel
28 Medium
30 Connection
32 First end
34 Arrow
36 Second end
38 Arrow
40 Connection
41 Connection
42 End
44 Connection
46 First end
48 Arrow
50 Second end
52 Connection
54 Arrow
56 Housing
57 Arrow
58 Inner circumferential lateral surface
60 Outer circumferential lateral surface
62 Channel element
64 Inner circumferential lateral surface
66 Helicoid
68 Lattice structure
70 Rod
72 Node
74 Mixing device
76 Cross section
78 Windings
80 Arrow
82 Guide element
L Length region
T Partial region

The invention claimed is:

1. A reactor comprising:
   a longitudinally extending reaction channel providing a flow path for a first reactant;
   a feed channel providing a flow path for a second reactant;
   multiple passage openings spaced apart from one another providing fluidic connecting between the feed channel and the reaction channel via respective partial streams for the second reactant;
   wherein the respective partial streams for the second reactant mix with the first reactant in the reaction channel to allow a chemical reaction of the first reactant and the second reactant; and
   a medium channel surrounding the reaction channel to bring a medium for exchange of heat with contents of the reaction channel and influencing a temperature of the reaction channel;
   wherein the reaction channel extends in a helical shape.

2. The reactor as claimed in claim 1, wherein:
   the feed channel defines a flow direction for the second reactant; and
   the passage openings are spaced apart from one another along the flow direction.

3. The reactor as claimed in claim 1, wherein the reactor is formed as a unitary body.

4. The reactor as claimed in claim 1, wherein the reactor is produced by means of a generative manufacturing process.

5. The reactor as claimed in claim 1, wherein the reaction channel extends in helical form around a length region of the feed channel.

6. The reactor as claimed in claim 5, wherein the length region of the feed channel runs rectilinearly.

7. The reactor as claimed in claim 1, wherein respective windings of the helical reaction channel with a winding direction run in undulating fashion along the winding direction and/or obliquely with respect to the winding direction and/or perpendicular to the winding direction.

8. The reactor as claimed in claim 1, further comprising a mixing device in the reaction channel for mixing the first reactant with the second reactant.

9. The reactor as claimed in claim 8, wherein the mixing device comprises a guide element and/or a turbulence generator.

10. The reactor as claimed in claim 1, wherein the reaction channel includes, in a partial region, a cross section varying along the longitudinal extent of the reaction channel.

11. The reactor as claimed in claim 1, further comprising a lattice structure in the medium channel which can be flowed around by the medium including multiple rods mechanically connected to one another at respective nodes of the lattice structure.

12. The reactor as claimed in claim 1, wherein:
the medium channel is delimited at one side by an inner circumferential lateral surface of a housing of the reactor and at the other side by an outer circumferential lateral surface of a channel element; and
the reaction channel is delimited by an inner circumferential lateral surface which is averted from the outer circumferential lateral surface of the channel element.

13. A method for producing a reactor, the method comprising:
producing a longitudinally extending reaction channel which can be flowed through along its longitudinal extent by a first reactant;
producing a feed channel fluidically connected to the reaction channel via multiple passage openings spaced apart from one another;
wherein a second reactant flows through the feed channel in respective partial streams of the second reactant fed via the passage openings to the reaction channel and thus to the first reactant (to allow a chemical reaction of the first reactant and the second reactant in the reaction channel; and
producing a medium channel surrounding the reaction channel and for delivering a medium to exchange heat with the reaction channel and influence a temperature of the reaction channel;
wherein the reaction channel extends in a helical shape.

14. A method for producing a product in a reactor, the method comprising:
conducting a first reactant through a longitudinally extending reaction channel, wherein the first reactant flows through the reaction channel along a longitudinal extent;
conducting a second reactant through a feed channel fluidically connected to the reaction channel via multiple passage openings spaced apart from one another;
wherein respective partial streams of the second reactant fed via the passage openings to the reaction channel to allow a chemical reaction of the first reactant and the second reactant in the reaction channel; and
conducting a medium through a medium channel surrounding the reaction channel to exchange heat between the medium and the reaction channel to influence a temperature of the reaction channel;
wherein the reaction channel extends in a helical shape.

* * * * *